United States Patent [19]
Miller

[11] 3,727,242
[45] Apr. 17, 1973

[54] LIQUID LEVEL INDICATION APPARATUS

[75] Inventor: Marshall W. Miller, Ann Arbor, Mich.

[73] Assignee: Thetford Corporation, Ann Arbor, Mich.

[22] Filed: Sept. 20, 1971

[21] Appl. No.: 181,735

[52] U.S. Cl. ............................4/10, 73/327, 350/112, 350/286, 137/559
[51] Int. Cl. ..............................................E03d 11/11
[58] Field of Search ....................4/10; 73/327, 330, 73/331; 350/112, 286; 137/559

[56] References Cited
UNITED STATES PATENTS

| 470,858 | 3/1892 | Klinger | 73/330 X |
| 1,576,897 | 3/1926 | Boizard | 73/327 |
| 2,923,157 | 2/1960 | Peifer | 73/327 |
| 3,345,870 | 10/1967 | Yoshinaga | 73/327 |

Primary Examiner—Henry T. Klinksiek
Attorney—Olsen & Stephenson

[57] ABSTRACT

Apparatus for indicating level of liquid in a recirculation type toilet or in other containers or tanks comprising an indicator lens which is free from any moving elements and indicates the level of the liquid by the application of the laws of light refraction.

4 Claims, 5 Drawing Figures

INVENTOR
MARSHALL W MILLER
BY OLSEN AND STEPHENSON
ATTORNEYS

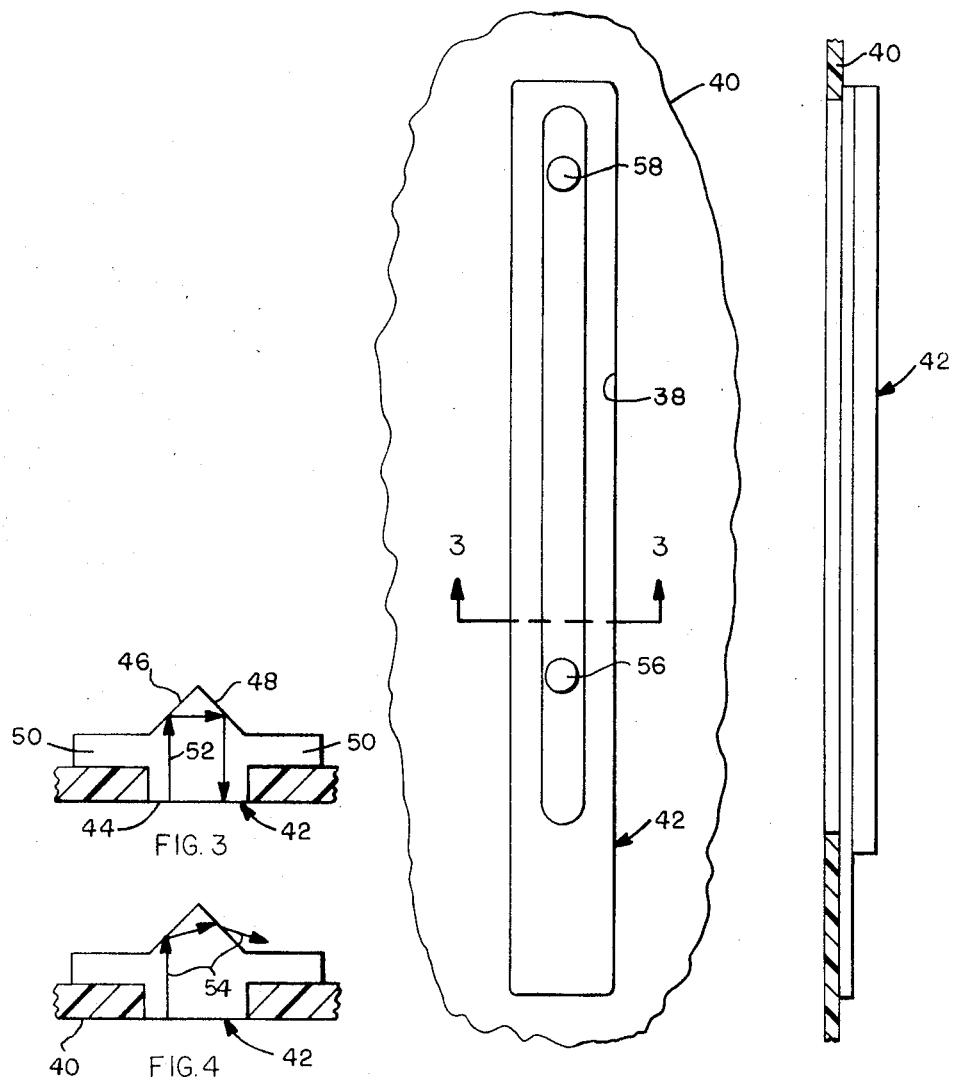

LIQUID LEVEL INDICATION APPARATUS

BACKGROUND OF THE INVENTION

The present invention relates to apparatus for indicating level of liquid in a tank, and particularly to such apparatus used in combination with a recirculation type toilet.

To obtain the most effective use of a recirculation type toilet it is essential that the liquid content of the holding tank of the toilet be maintained between prescribed minimum change level and maximum full level limits. These limits are maintained most effectively by visual observation, and for this purpose sight gauges are desirable. Normally, sight gauges have moving parts or are constructed and arrange so as to be costly, and there is a need to provide an improved sight gauge that will more adequate serve the requirements of the users.

SUMMARY OF THE INVENTION

The level indicator apparatus embodying the present invention has overcome the inadequacies of the prior art and provides an accurate level indication means which gives an instant reading of liquid level in the holding tank, or the like, and is free of moving parts or components. The apparatus is also very simple in construction and is readily adapted for low cost, large volume production.

In a preferred form of the present invention a recirculating type toilet is provided which has a holding tank, a bowl position in the upper portion of the holding tank and having a discharge outlet at its bottom in communication with the interior of the holding tank, a recirculation pump with an inlet adjacent to the bottom of the holding tank, and a liquid level indicator mounted on the wall of the holding tank for indicating the level of liquid in the tank. The tank has a vertical slot in the wall extending from approximately the level of the inlet of the pump to approximately the level of the outlet of the bowl. The indicator is a transparent prism mounted in the slot to close the same, said indicator having a front face exposed to the exterior of the tank and rear faces exposed to the interior of the tank, the rear faces being shaped so that when unwetted the light from the exterior of the tank will be reflected back to the viewer creating a sliver image, and the portion of the rear surfaces which are submerged in liquid will disperse the light thus creating a dark image. It is desired that the liquid level be maintained between the inlet of the pump and the outlet of the bowl, and indicia corresponding to these levels can be located on the prism or adjacent thereto.

Thus, it is one of the object of the present invention to provide an improve liquid level indicator for use with holding tanks of toilets and other containers adapted to hold liquids.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 2 is a fragmentary enlarged front elevational view of the liquid level indicator mounted in the front wall of the toilet illustrated in FIG. 1;

FIG. 3 is an enlarged fragmentary section taken on the line 3—3 of FIG. 2 illustrating the reflection of light that occurs when the inner surface of the prism is unwetted;

FIG. 4 is a view similar to that of FIG. 3, but showing the light refraction that occurs when the inner surface of the prism is wetted; and FIG. 5 is a fragmentary section illustrating the liquid level indicator in side elevation.

DESCRIPTION OF THE PREFERRED EMBODIMENT

Figure 1:
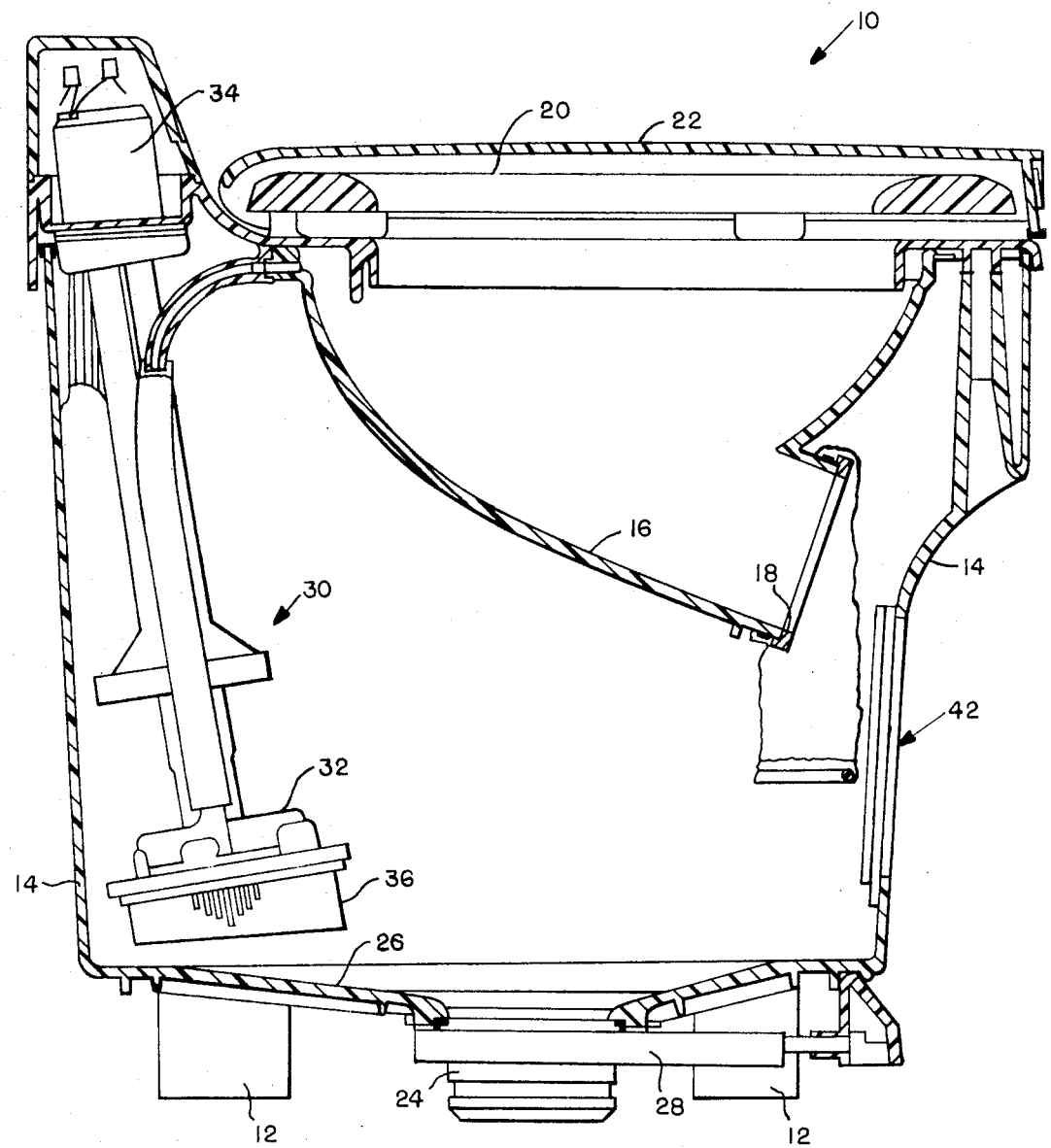
FIG. 1 is a vertical section through a self-contained recirculating toilet embodying features of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The self-contained toilet 10 has legs 12 adapted to rest on a supporting surface. The toilet 10 includes the holding tank 14 in which is mounted the toilet bowl 16. The latter has a discharge outlet 18 at its bottom in communication with the interior of the holding tank 14. A conventional toilet seat 20 and cover 22 are suitably mounted on the holding tank 14. The holding tank 14 has a discharge outlet 24 in its bottom wall 26, and a suitable gate valve 28, such as is shown in U.S. Pat. No. 3,333,814, granted Aug. 1 1967 to Ronald J. Sargent is mounted for normally closing the discharge outlet 24. For a more detailed description of the gate valve 28, reference is made to the cited U.S. Pat. No. 3,333,814.

A pump apparatus 30 is mounted at the rear of the holding tank 14 16, circulating a quantity of relatively clear liquid from the tank 14 to the bowl 16. and for return to the tank 16 via the outlet 18. The pump apparatus 30 includes the pump means 32 which has an electric motor 34 at its upper end adapted to be driven from a suitable source of electric current. A strainer basket 36 is provided at the lower end of the pump 32 and acts as the inlet for the pump. For a more detailed description of the pump and filter apparatus 30, reference is made to U.S. Pat. No. 3,593,345, issued July 20, 1971 to Charles B. Wells et al.

In the normal operation of the circulation type toilet 10, it is desirable that the liquid in the holding tank 14 be maintained between minimum and maximum levels which correspond to the inlet to the pump 32 and the outlet 18 from the bowl 16.

To facilitate the most effective use of the toilet 10 a vertical slot 38 has been cut in the front wall 40 of the holding tank 14, and a fluid indicator lens 42 is mounted therein. The indicator lens 42 is a transparent prism having a front face 44 exposed to light from the exterior of the tank and rear faces 46 and 48 exposed to the relatively dark interior of the tank. In the preferred form of the invention illustrated in the drawings, the indicator lens is formed of a clear acrylic plastic material with the rear faces 46 and 48 at angles of 45° to a perpendicular from the front face 44. The prism also has a peripheral flange 50 projecting laterally therefrom for mounting the prism in a vertical position in sealed relationship over the slot in the wall 40.

It has been discovered that if a transparent prism of suitable shape is mounted in the wall of a closed container that is adapted for holding liquid, the prism can accurately indicate the level of the liquid in the container. This result is achieved by application of the laws of light refraction. It is found that when the prism is employed for this purpose, and the prism is mounted in a vertical position in the wall with the face of the prism that is to be viewed exposed to the light outside the container and the other faces of the prism exposed to the interior of the container, the angle of refraction of the exposed light differs for fluids in the container of different densities. Under these circumstances the prism will have a different appearance above and below a horizontal line representing the level of a liquid in the container.

Thus, by way of example, when the container is partially filled with liquid and a prism of suitable shape is used, the portion of the prism above the liquid will reflect the light from outside the container, whereas, the portion of the prism below the liquid level which is contacted by the liquid will refract the exposed light at a different angle so that the light will not be reflected back through the exposed face of the prism, thereby showing merely the dark interior of the container.

Attention is directed to the series of lines with arrowheads at 52 in FIG. 3 of the drawings which show the path the light waves will travel in the prism or lens 42 when the surface on the interior of the prism is unwetted. When the light travels in the path illustrated in FIG. 3 all of the light from exterior of the tank 14 will be reflected back creating a sliver-like image. In contrast, when the interior surface of the indicator lens is wetted as indicated in FIG. 4, the same light waves will be refracted as indicated at 54 so that reflection does not occur and the viewer from outside the tank 14 will see the dark interior of the tank 14 thereby creating a distinctly different impression on the lens 42 from that which is created when a different fluid, namely air, contacts the inner faces 46 and 48.

Thus, it can be seen that a very simple low cost level indicating device has been provided for use with holding tanks and the like. Preferably, the front face 42 will have indicia 56 and 58 thereon corresponding to the minimum and maximum levels desired within the holding tank 14 so that the user can readily recognize when the toilet 10 is being operated within the desired liquid levels.

The level indicator lens 42 is primarily adapted for use with a recirculating type toilet, but it will be recognize that it may be used to indicate the level of liquids in any closed container.

It is claimed:

1. A recirculating type toilet having a holding tank, a bowl positioned in the upper portion of said holding tank and having a discharge outlet at its bottom in communication with the interior of the holding tank, a recirculation pump with an inlet adjacent to the bottom of said holding tank, and a liquid level indicator mounted in the wall of said holding tank for indicating the level of liquid in said tank, said tank having a vertical slot in the wall of said tank extending from approximately the level of said inlet of the pump to approximately the level of said outlet of the bowl, said indicator being a transparent prism mounted in said slot to close the same and having a front face exposed to the interior of the tank and rear faces exposed to the interior of the tank, the front and rear faces being arranged so that substantially total reflection of light from the exterior of the tank will occur only at those portions of the rear faces that are above the liquid level in the tank, said indicator having indicia indicating the lower end upper limits for liquid in said tank, the indicium indicating the lower limit being above the level of the inlet of said pump and the indicium indicating the upper limit being below the level of the outlet of said bowl.

2. The recirculating type toilet that is defined in claim 1, wherein said transparent prism has a front face parallel to a plane defined by said slot, and two rear faces symmetrically arranged relative to the front face and inclined at angles of 45° to a perpendicular from said front face.

3. The recirculating type toilet that is defined in claim 1, wherein said transparent prism has laterally projecting portions which are secured to the edges of said slot so that the opening in the wall provided by the slot is sealed closed.

4. The recirculating type toilet that is defined in claim 1, wherein said transparent prism is a clear acrylic plastic material.

* * * * *